United States Patent [19]
Fast
[11] Patent Number: 4,483,502
[45] Date of Patent: Nov. 20, 1984

[54] SUPPORT UNIT FOR DISPLAY ITEMS

[76] Inventor: Jacob Fast, 7561 NW. 9th St., Plantation, Fla. 33317

[21] Appl. No.: 422,009
[22] Filed: Sep. 23, 1982
[51] Int. Cl.³ ............................................ F16B 5/06
[52] U.S. Cl. ............................ 248/222.1; 40/10 R; 40/11 R; 248/220.2
[58] Field of Search ............... 248/222.1, 222.2, 220.2, 248/220.3, 221.4, 307, 467; 211/86, 118, 71, 73; 40/10 R, 11 R

[56] References Cited

U.S. PATENT DOCUMENTS

| | | | |
|---|---|---|---|
| 754,503 | 3/1904 | Rubicam et al. | 248/307 |
| 2,755,576 | 7/1956 | Golden | 40/10 R |
| 2,935,804 | 5/1960 | Duckro | 40/10 R |
| 3,169,330 | 2/1965 | Deuchar | 40/11 R |
| 3,642,147 | 2/1972 | Voorhies | 248/307 |
| 3,774,328 | 11/1973 | Tanney | 40/10 R |
| 4,016,977 | 4/1977 | Krautsack | 248/221.4 |
| 4,094,415 | 6/1978 | Larson | 248/220.3 |
| 4,181,553 | 1/1980 | Hogg | 248/467 |
| 4,362,285 | 12/1982 | Lewis | 248/221.4 |

FOREIGN PATENT DOCUMENTS

| | | | |
|---|---|---|---|
| 2706002 | 8/1978 | Fed. Rep. of Germany | 248/221.4 |

*Primary Examiner*—William H. Schultz
*Assistant Examiner*—Ramon O. Ramirez
*Attorney, Agent, or Firm*—Holman & Stern

[57] ABSTRACT

An integral unit for suspending one or more apertured items for display forwardly of a display shelf is arranged to be secured to the forward edge of the shelf or, alternatively, to a hook which is secured to the shelf. The unit is made of flexible plastic and includes a tag-like mounting portion which has two spaced and aligned bottom support edges adapted to be supported on a support ledge at the shelf forward edge. If that forward edge is a standard price molding, the mounting portion can be resiliently engaged therein. An item-supporting portion extends from between the support edges and is flexible to be suspended forwardly thereof. The item-supporting portion has one or more finger-like hook members adapted to support the apertured items for display. In one embodiment, the hook members are reinforced by an arcuate cross-section which is more pronounced near the hook tip. An inverted U-shaped punch-out portion surrounds the hook and, once removed, permits the hook to be bent out of plane to support an apertured item. Alternatively, the hook may have a winged tip which is flexibly foldable to be inserted through the aperture in the displayed item.

16 Claims, 12 Drawing Figures

SUPPORT UNIT FOR DISPLAY ITEMS

TECHNICAL FIELD

The present invention relates to articles of manufacture suitable for supporting apertured items for display. More particularly, the invention relates to support for displayed items which can be suspended forwardly of a display shelf. The displayed items generally take the form of blister packs, apertured sheets of promotional material, and the like but are not so limited.

BACKGROUND OF THE INVENTION

Apertured items such as blister packs and the like are generally suspended in front of a display shelf on which other items for display are supported. The apertured items may be suspended one-behind-the-other from a common hook-like member, such as the well known J-hook. The J-hook, although widely used, can be somewhat disadvantageous since it projects considerably forward of the display shelf into an aisle travelled by shoppers. The projecting J-hook can thus cause injury or damage to the person or clothing of the shoppers.

An alternative to the J-hook is the clip-strip, such as described and illustrated in my U.S. patent application Ser. No. 358,868, filed Mar. 17, 1982, and entitled "Support Hook And Assembly For Merchandising Display". The clip-strip is suspended from the forward edge of a display shelf and supports items for display one above the other. This arrangement greatly reduces the danger to passing shoppers. However, the clip-strip requires a separate structure in order to attach it to the display shelf, thereby increasing its costs. Moreover, the clip-strip employs a clamping action between two resiliently biased contacting surfaces to support the display items so that the display item must be made of rigid cardboard, or the like, in order to permit ease of insertion into the clamp arrangement. Thus, paper items such as sheets of promotional material, are not easily displayed from clip-strips and, moreover, removal and insertion of even the rigid cardboard blister packs from the clamp members is less than ideal. On the other hand, an apertured blister pack is easily inserted on a hook-like member.

SUMMARY OF THE INVENTION

It is therefore an object of the present invention to provide a unit for supporting apertured items, such as blister packs, promotional material, etc., forwardly of a display shelf without projecting dangerously far in front of the shelf.

It is another object of the present invention to provide a unit for supporting items for display by suspending the items from a display shelf, which unit is simple and inexpensive to manufacture, but is simply and quickly deployed.

It is still another object of the present invention to provide an integrally formed flexible plastic member which can readily be supported on the forward edge of a display shelf and which itself can support one or more apertured items immediately forward of the shelf.

Still another object of the present invention is to provide an integrally formed flexible plastic member which supports apertured items for display and which can be secured to the forward edge of a display shelf in alternative manners such as resilient engagement to a price molding, adhesive attachment to the shelf edge, or by an intermediate hook which engages both the shelf and the unit.

In accordance with the present invention, a support unit includes a flexible tag-like mounting portion having a bottom support edge divided into two (2) longitudinally-spaced and alignable edge segments. The edge segments are adapted to rest on a lower ledge formed in the forward edge of a display shelf. If the shelf forward ledge is a price molding, the tag-like mounting portion is flexed about an axis disposed parallel to the edge segments so that the upper edge of the mounting portion engages the upper ledge of the price molding and the mounting portion is secured by flexible engagement to the price molding. Alternatively, the back of the mounting portion may be provided with an adhesive backing to hold the mounting portion in place with the edge segments resting on the lower shelf ledge.

The support unit further includes an integral item-supporting portion in the form of a strip or flap member which extends through the space between the edge segments of the mounting portion. The flap includes one or more finger-like support hooks which are die-cut or otherwise removable from the flap roots or bottom ends, thereby permitting the distal ends of the hooks to be bent or flexed out of the plane of the flap or strip so that one or more apertured items may be suspended from the hooks. In one embodiment, the hooks are arranged one-above-the-other and are contoured arcuately in a dimension transverse to their lengths to impart strength thereto. In another embodiment, the hook has a bi-winged tip which is flexibly foldable to permit it to be inserted into an aperture of a display item; the wings resiliently unfold to lock the item onto the hook. This latter arrangement is suitable for promotional paper sheets which can be placed on the hook in stacks and then individually torn off the hook by shoppers.

An alternative means for supporting the unit is provided by a mounting hole defined in the item-supporting portion and communicating with a slit which in turn communicates with the cut-out region surrounding the uppermost hook. A separate hook member can then be secured to the shelf and inserted into the mounting hole via the slit so as to support the unit from the shelf.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

Figure 1:
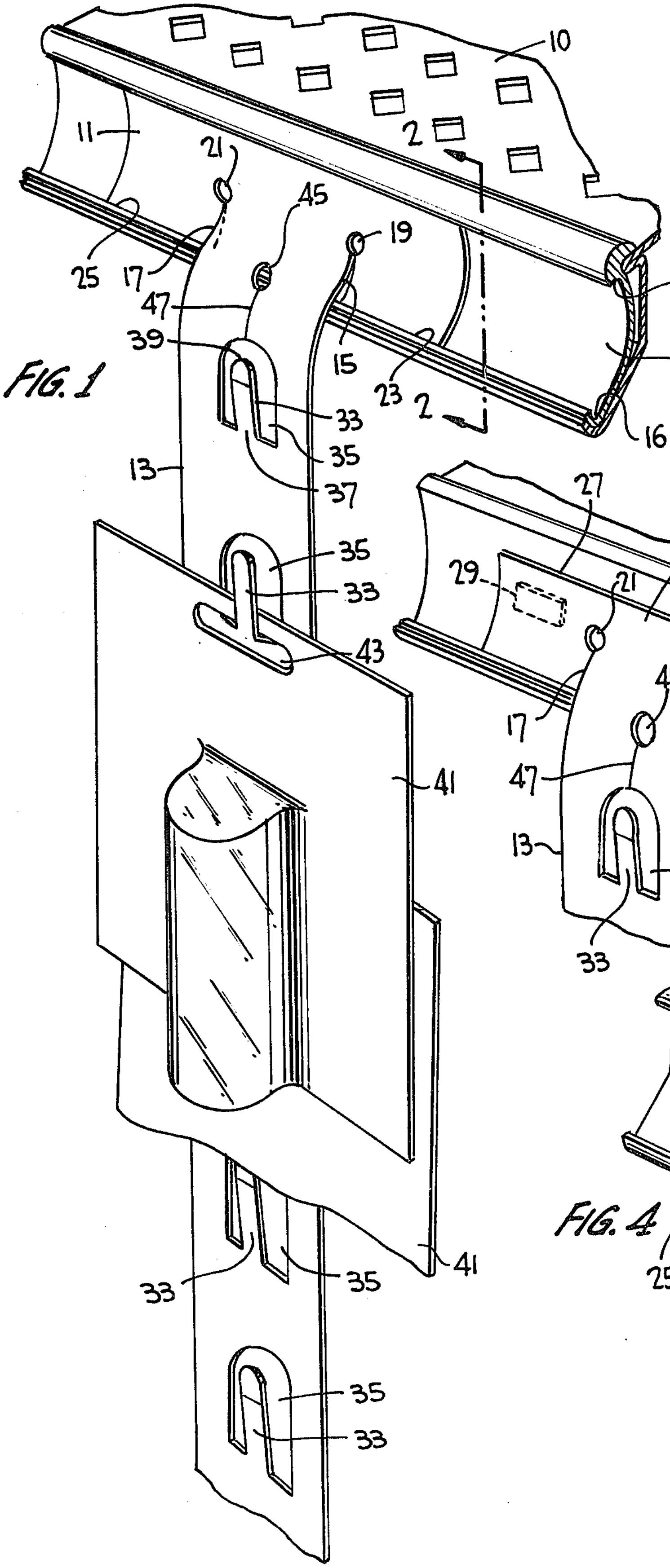
FIG. 1 is a view in perspective of one embodiment of the present invention shown secured to a price molding of a display shelf and supporting an apertured item for display.
Figure 2:
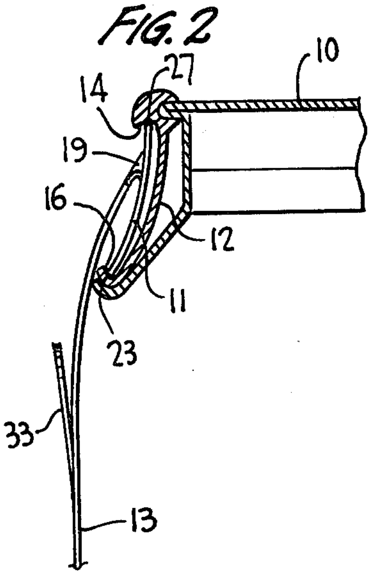
FIG. 2 is a view in section taken along lines 2—2 of FIG. 1.

Referring specifically to FIGS. 1 and 2 of the accompanying drawings, a support member for display items includes a flexible tag-like mounting portion 11 and a flap or strip-like item-supporting portion 13. The entire unit is formed as an integral member and is preferably made of flexible plastic material. In the embodiment illustrated in FIGS. 1 and 2, the integral support unit is adapted to be secured to a display shelf 10 having a forward edge in the form of a conventional price molding 12. Price molding 12 extends as a horizontal strip and is concave in a vertical sense. It is bounded at its bottom by a lower ledge 16 and at its top by an upper ledge 14. The shelf 10 is typical of display shelves seen in retain establishments for supporting merchandise displayed for purchase.

Figure 3:
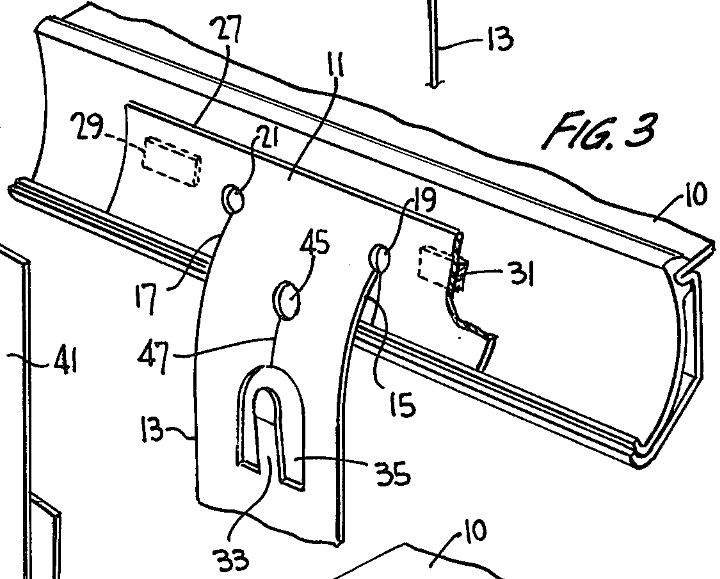
FIG. 3 is a view in perspective of a portion of the embodiment of FIG. 1 shown secured to a different type of display shelf.

The support unit takes a generally T-shaped configuration wherein the mounting portion 11 serves as the cross-member of the T and the item-supporting member serves as the stem of the T. A pair of slits 15 and 17 are cut into the mounting portion 11 as extensions of the stem or item-supporting portion 13. The slits 15 and 17 extend substantially midway through the height dimension of the mounting portion 11 and terminate in respective through holes 19 and 21. The through holes 19 and 21 define a straight line therebetween along which the item supporting portion 13 is flexible out of plane with respect to the mounting portion 11. With the item-supporting portion 13 extending into the height dimension of the mounting portion 11, the bottom edge of the mounting portion 11 is subdivided into two (2) straight edge segments 23 and 25. These edge segments 23 and 25 are placed in longitudinal alignment in ledge 16 of price molding 12 so as to provide the main support for the overall unit within the price molding. The upper edge of mounting portion 11 is inserted into upper ledge 14 by flexing the mounting portion so that its forward-facing surface is concave in a vertical sense. The mounting portion 11 is thus flexed so as to be resiliently engaged between the ledges 14 and 16 in the price molding. Alternatively, as illustrated in FIG. 3, the price molding or forward edge of the shelf 10 may not have an upper ledge. Under such circumstances, the straight edge segments 23 and 25 still reside in the bottom ledge to provide the primary support; however, pads 29 and 31 may be provided on the rear surface of mounting portion 11. The rearward facing surfaces of the pads 29 and 31 are coated with adhesive to permit the pads to be adhesively secured to the forward-facing surfce of the shelf edge.

Referring once again to FIGS. 1 and 2, the item-supporting portion 13 may take the form of an elongated strip having a plurality of vertically-aligned and spaced support hooks 33 defined therein. Each support hook 33 is defined within a cut-out region 35 of item-supporting portion 13, which cut-out region 35 is of a generally inverted U-shaped configuration. During the fabrication of the unit, this generally inverted U-shaped configuration 35 is die-cut into the unit so that it can be punched out prior to deployment of the unit on the shelf. Upon removal of the inverted U-shaped die-cut portion, a finger-like projection, corresponding to the space between the U-shape, remains and serves as the hook 33. The hook 33 projects generally upward when the item-supporting portion 13 is suspended downwardly from shelf 10. The hook 33 is an integral part of the overall unit comprising tag-like mounting portion 11 and strip-like item-supporting portion 13. Each hook has a root or proximal end 37, by which it remains secured to the overall unit, and an upwardly projecting distal end 39. The hook may be pushed forwardly of the cut-out region 35 so as to permit an apertured item 41 to be placed on the hook, as illustrated in FIG. 1. The apertured items 41 which are illustrated in FIG. 1 are blister pack display cards of a conventional design which have apertures 43 capable of receiving hooks 33 therein. The blister packs are thus suspended from respective hooks 33 at vertically spaced locations corresponding to the hook locations.

Figure 4:
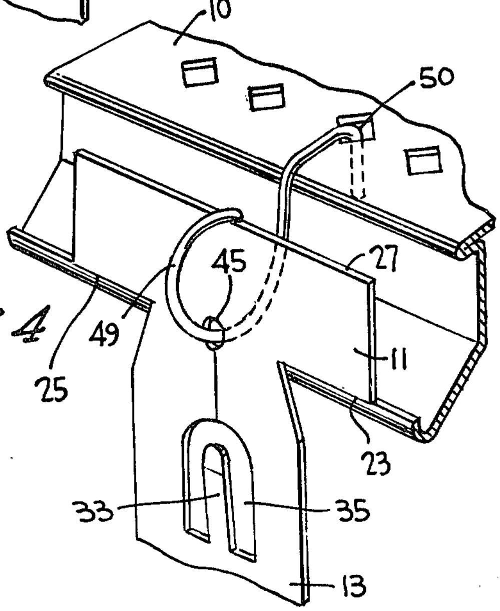
FIG. 4 is a view in perspective of a portion of the embodiment of FIG. 1 shown supported from a display shelf by means of a support hook.

Located just above the uppermost cut-out portion 35 in the item-supporting portion 13 is a through hole 45. The item-supporting portion 13 is slit through its thickness from the mounting hole 45 to the uppermost cut-out portion 35. The slit 47 permits a hook, such as hook 49 of FIG. 4, to be inserted into the uppermost cut-out portion 35, pulled through the slit 47 so as to reside in a position where it extends through the mounting hole 45. Hook 49 is a hook of the general type described and illustrated in my co-pending U.S. patent application Ser. No. 358,868, filed Mar. 17, 1982 and entitled "Support Hook And Assembly For Merchandising Display". In other words, as illustrated in FIG. 4, mounting hole 45 and slit 47 provide an alternative mounting arrangement for the integral support unit whereby the mounting portion 11 need not contact the forward edge of the shelf but the entire unit is suspended by the hook 49 forwarding of the shelf. In this respect, the shelf 10 must be provided with a through hole 50 for receiving the hook 49 in a manner whereby its curved forward end projects forwardly of the shelf. Such apertured display shelves are quite common in retail establishments such as grocery stores, drug stores, hardware stores, and the like.

Figure 5:
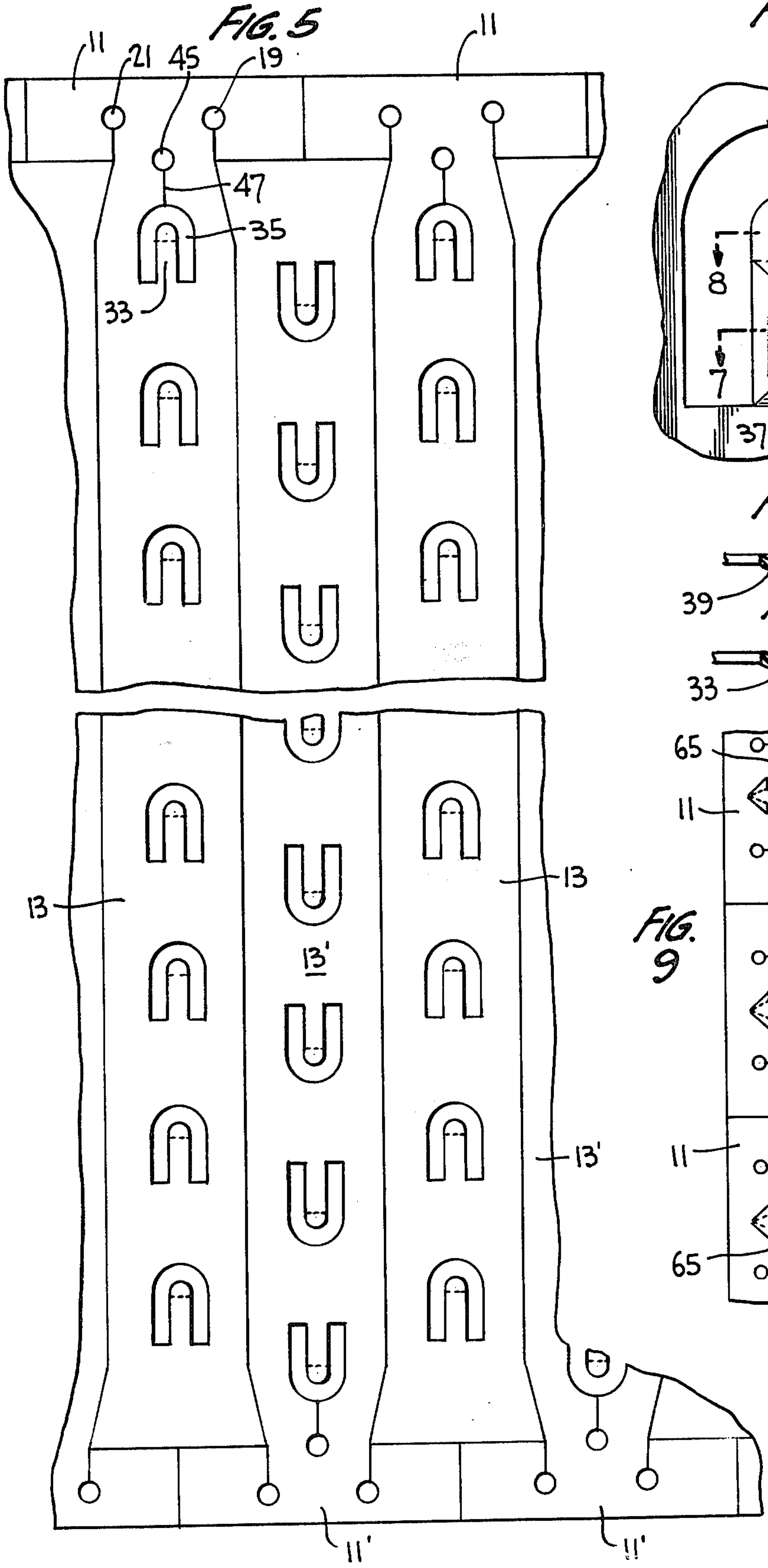
FIG. 5 is a view in perspective of a sheet of plastic material in which a plurality of units of the type illustrated in FIG. 1 are die-cut.

The individual integral generally T-shaped support units may be fabricated with a minimum waste of space in side-by-side relationship on a common sheet of plastic material. Such an arrangement is illustrated in FIG. 5, wherein the common sheet of plastic material is designated by the reference numeral 51. The individual units are die-cut into the sheet for subsequent punch-out removal and are mutually oriented in opposite longitudinal orientations. Specifically, the mounting portion 11, which corresponds to the cross-member of the T-configuration, of alternate units have abutting sides. Between the item-supporting portions 13 of these alternate, there is disposed the item-supporting portion 13′ which extends in the opposite longitudinal direction and has its remote end positioned so as to share a punch-out line with edge segment 23 of one adjacent unit and edge segment 25 of the other adjacent unit. Item-supporting portion 13' of the intermediate unit has its opposite edges sharing die-cut punch-out lines with respective edges of its adjacent, oppositely-oriented item supporting portions 13. Similarly, the mounting portion 11' of the intermediate unit has its edges sharing die-cut lines with edges of other support units formed in the sheet and disposed on opposite sides of the two units which are disposed adjacent item-supporting portion 13.

It is noted that the item-supporting portion 13 of each unit has parallel longitudinally-extending edges throughout most of its length but that these edges converge in a direction toward mounting portion 11 in the region which approaches support edge segments 23 and 25. This narrowing or necking down of the item-supporting portion 13 provides for greater length in the support edge segments 23 and 25 and thereby provides for greater mounting stability in the deployment arrangements illustrated in FIGS. 1 and 3. In order to permit common sheet configuration in the manner illustrated in FIG. 5 without wasting space or complicating fabrication, the remote end of each item-supporting member 13 has its longitudinally-extending edges diverging in a direction away from the mounting portion 11 at a location immediately at the distal end of the item-supporting portion 13. The angle of divergence at this distal end corresponds precisely to the angle of convergence at the proximal end of item-supporting member 13 so that each diverging edge section may share a die-cut line with a converging edge section of the adjacent unit. As noted in FIG. 5, the common sheet 51 of plastic material can therefore be used to fabricate multiple support units without any waste of space between individual units.

Figure 6:
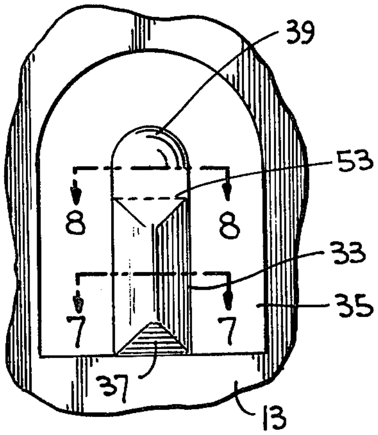
FIG. 6 is an enlarged view in plan of a portion of the embodiment of FIG. 1.
Figure 8:
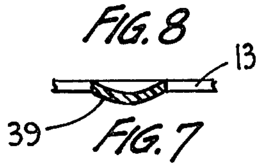
FIG. 8 is a view in perspective taken along lines 8—8 of FIG. 6.
Figure 7:
FIG. 7 is a view in section taken along lines 7—7 of FIG. 6.

Referring to FIGS. 6, 7, and 8, the individual hook members 33 may be fabricated as part of the overall mold in a manner which provides additional support strength for the hook. Specifically, the root 37 and most of the length of each hook member 33 may be rendered arcuate in a transverse direction to impart a degree of rigidity to the hook member and thereby strengthen it for purposes of supporting apertured items. The distal end 33 of the hook member is provided with an even greater degree of curvature so as to render the distal end even stronger than the root and intermediate portion of the hook. In use, the hook member 33 is bent forwardly (i.e., out from the plane of the drawing in FIG. 6) so that it points obliquely upward and forwardly of the item-supporting member 13. A perforated fold line 53 is provided near the tip 39 along which the hook 33 may be bent in opposite sense (i.e., toward the plane of the drawing in FIG. 6). The bent tip or distal end 39 thus prevents apertured items from sliding off the hook 33. The bent distal end 33 thus permits more than one (1) item to be supported from the hook with minimal danger that the weight of the items will cause them to slide off the hook. More specifically, if the weight of the items suspended from the hook causes the hook to be pulled forwardly, the bent-in tip 39 acts as a stop to preclude the items from falling from the hook.

Figure 12:
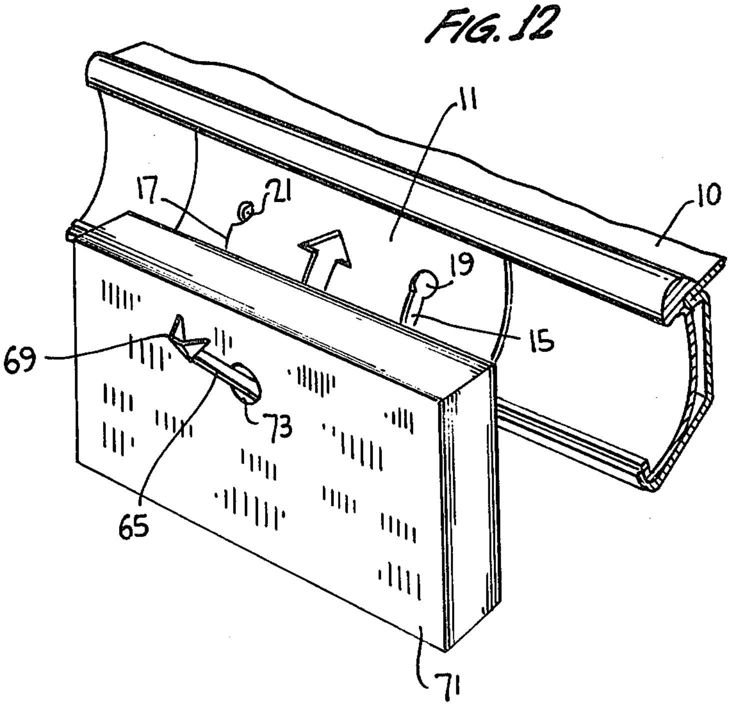
FIG. 12 is a view similar to that of FIG. 11 but showing the support unit deployed to support a stack of individual sheets of paper bearing promotional printed matter.

Referring specifically to FIGS. 9–12 of the accompanying drawings, a further embodiment of the present invention is adapted to support a stack 71 of sheets of paper bearing promotional messages, or the like. More specifically, the unit of this embodiment has a mounting portion 11 which is substantially identical to the similarly designated mounting portion of the embodiment of FIG. 1. Therefore, slits 15 and 17, through holes 19 and 21, edge segments 23 and 25, and top edge 27 are designated with the same reference numerals as employed for identical features of the embodiment of FIG. 1. The item-supporting portion 63 of the second embodiment disclosed is illustrated as having only one (1) hook 65; however, it is to be understood that a plurality of such hooks may be employed depending upon the length of the item-supporting portion 63 for any given application. The hook 65 is die-cut directly into the item-supporting portion without any removable or cut-out portions such as cut-out portion 35 in the embodiment of FIG. 1. Hook member 65 is integrally formed with the overall unit at its root 67 and tapers slightly toward its distal end. The distal end expands in a bi-winged configuration 69 wherein the wings are selectively foldable along perforated fold lines defined during molding of the unit. When the wings of distal end 69 are folded toward one another, the distal end can be inserted through a plurality of aligned apertures 73 defined in each of the sheets of paper in stack 71. The wings can then be unfolded when the stack of paper is supported through the aperture 73 as illustrated in FIG. 12. The unfolded wings preclude removal of the individual sheets of paper from hook member 65 unless the wings are folded together once again. With the wings unfolded, individual sheets may be torn off hook 65.

Figure 9:
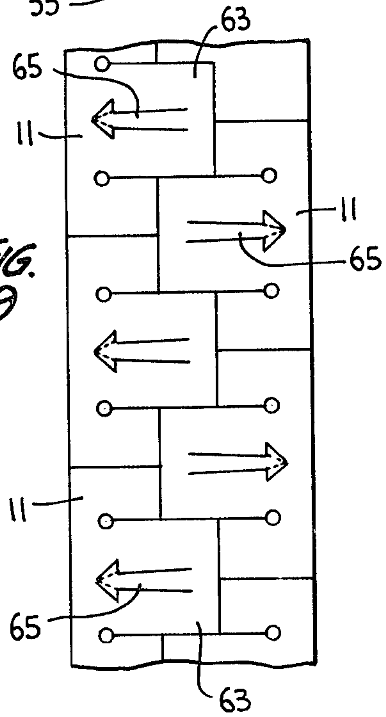
FIG. 9 is a plan view of a portion of a strip of plastic material which is die-cut for the purpose of fabricating a plurality of units corresponding to a second embodiment of the present invention.
Figure 10:
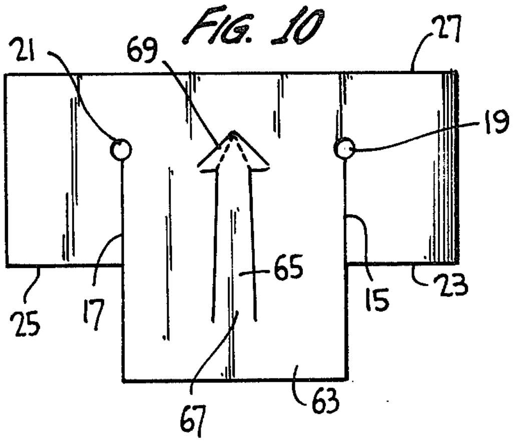
FIG. 10 is a plan view of an individual unit of the type fabricated from the sheet illustrated in FIG. 9.
Figure 11:
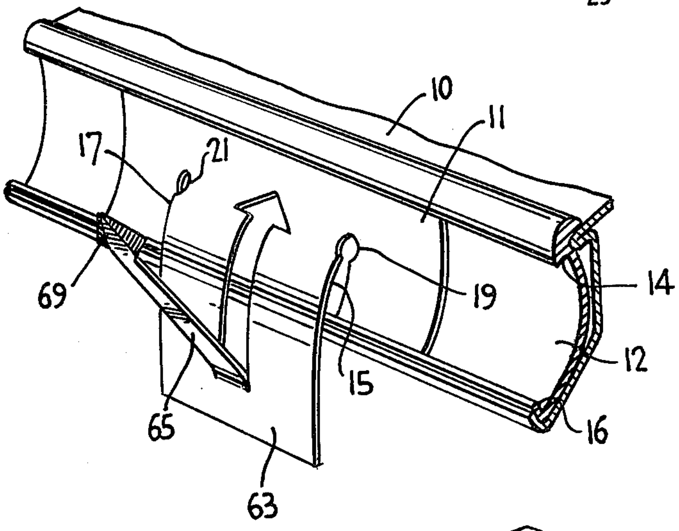
FIG. 11 is a view in perspective of the embodiment illustrated in FIG. 10 and shown secured to a price molding of a display shelf.

The unit illustrated in FIG. 10 may be fabricated as part of the common sheet of plastic material which is molded with appropriate die-cut lines and folds in the manner illustrated in FIG. 9, whereby adjacent units are oriented in opposite longitudinal directions similar to the arrangement illustrated in FIG. 5.

It should be understood that the holes 19 and 21 which terminate the slits 15 and 17 in the mounting portion 11 can be eliminated, if desired. However, holes 19 and 21 permit the item-supporting portion 13 to be flexed considerably forward of the mounting portion 11 without causing tearing or ripping of the mounting portion 11 in the form of extensions or slits 15 and 17. In other words, holes 19 and 21 relieve the stress introduced at the upper end of slits 15 and 17 when the item-supporting portion is flexed forwardly.

In order to facilitate fabrication of multiple units of one (1) sheet with minimal waste of space, it is desirable that the width of the mounting portion 11 be selected to be twice the width of the item-supporting portion 13 for both embodiments.

While I have described and illustrated various specific embodiments of my invention, it will be clear that variations from the details of construction which are specifically illustrated and described may be resorted to without departing from the true and spirit and scope of the invention as defined in the appended claims.

What I claim is:

1. An article of manufacture for supporting apertured items for display from a display structure having a forward edge with a straight support ledge, said article comprising an integrally-formed unit having a mounting portion and an item-supporting portion, wherein said mounting portion is a flexible tag-like member including a support edge divided into two spaced straight edge segments which are adapted to be linearly aligned to contact said support ledge when said article is in use, said segments defining a space therebetween, and wherein said item-supporting portion comprises a flap-like member projecting through said space and outwardly beyond said edge segments from a location on said mounting portion inward of said edge segments, said item-supporting portion being flexible out of plane with respect to said edge segments, so as to be disposed forwardly of said support ledge when said edge segments are in linear contact with said support ledge, said item-supporting portion further including at least one finger-like member with a proximal end secured to said flap-like member and a remote end which is flexibly bendable forwardly of said flap-like member to engage an apertured item for display.

2. The article of manufacture according to claim 1, wherein said integrally-formed unit includes a pair of through holes formed therein to define a line between the through holes which is parallel to said edge segments, said line defining a proximal end of said flap-like member, and wherein said flap-like member is rendered flexible out of plane with respect to said edge segments by means of a pair of slits through said unit extending inwardly from said edge segments along opposite sides of said flap-like member to said pair of through holes, respectively.

3. The article of manufacture according to claim 2, wherein said slits extend perpendicular to said edge segments.

4. The article of manufacture according to claims 1, 2, or 3, further comprising adhesive means secured to a rear surface of said tag-like member to permit that surface to be secured to said forward edge.

5. The article of manufacture according to claims 1, 2, or 3, wherein the forward edge of said display structure is a price molding in which said support ledge is disposed horizontally and wherein an upper ledge is defined in parallel spaced relation to said support ledge, said forward edge including a generally concave surface extending between said ledges, said mounting portion of said unit further comprising a top edge extending parallel to said edge segments and spaced therefrom by a distance greater than the short distance between said upper ledge and said support ledge, and wherein said tag-like member is flexible about an axis disposed parallel to and intermediate said top edge and said edge segments to permit said tag-like member to be flexed and resiliently engaged between said upper ledge and said support ledge with said flap-like member suspended therefrom forwardly of said price molding.

6. The article of manufacture according to claim 1, wherein said flap-like member includes a plurality of said finger-like members arranged in vertically spaced linear alignment, all of said finger-like members being bendable forwardly of the flap-like member to support apertured items for display.

7. The article of manufacture according to claim 6, wherein each finger-like member includes a remote tip portion which is bendable rearwardly.

8. The article of manufacture according to claim 7, wherein the tip portion of each finger-like member is contoured with a convex forward surface and a concave rearward surface.

9. The article of manufacture according to claim 8, wherein said finger-like members have a substantially uniform width throughout their length except for the tip portion which tapers to provide a convex edge.

10. The article of manufacture according to claims 6 or 8, wherein said finger-like members are defined within respective inverted U-shaped cut-out regions of said flap-like member.

11. The article of manufacture according to claim 10, wherein said flap-like member includes:

a mounting hole defined therethrough at a location above the uppermost of said inverted U-shaped cut-out regions; and a slit cut through said flap-like member and extending said between said mounting hole and said uppermost inverted U-shaped cut-out region.

12. The article of manufacture according to claim 6, wherein said flap-like member has side edges which are parallel throughout most of their lengths, which converge at a predetermined angle proximate one end of said flap member and which diverge at said predetermined angle proximate another end opposite said one of said flap member.

13. The article of manufacture according to claim 12, further comprising a plurality of said integrally-formed units formed as punch-out portions of a common sheet of flexible plastic material and oriented such that adjacent units extend in opposite longitudinal directions and such that each diverging section of a flap-like member edge shares a common punch-out die-cut with a converging portion of a flap-like member edge of an adjacent unit.

14. The article of manufacture according to claim 13, wherein each integral unit has a generally T-shaped configuration wherein said mounting portion constitutes a cross-bar of said T-shaped configuration and said item-supporting portion constitutes a stem of said T-shaped configuration and wherein the width of said mounting portion is exactly twice the width of said item-supporting portion.

15. The article of manufacture according to claim 6, wherein said flap-like member has side edges which are parallel throughout most of their lengths but which converge toward one another proximate said edge segments to increase the length of said edge segments.

16. The article of manufacture according to claim 1, wherein said finger-like member includes a distal end having a pair of flexibly foldable wings to permit insertion of said distal end through said apertured items when the wings are folded and to preclude removal of said distal end from said apertured item when the wings are unfolded.

* * * * *